United States Patent [19]

Blaney

[11] Patent Number: 4,789,058

[45] Date of Patent: Dec. 6, 1988

[54] AESTHETIC DISPLAYING DEVICE FOR VIDEO CASSETTE TAPES AND THE LIKE

[76] Inventor: Lawrence F. Blaney, 2858 Mead St., Yorktown Heights, N.Y. 10598

[21] Appl. No.: 153,988

[22] Filed: Feb. 9, 1988

[51] Int. Cl.$^4$ .................... A65D 85/57; A65D 85/672
[52] U.S. Cl. ................................ 206/232; 206/307; 206/387; 206/457; 206/459; 206/472
[58] Field of Search ................ 40/312, 340; 206/232, 206/307, 309–313, 387, 425, 444, 457, 459, 472

[56] References Cited

U.S. PATENT DOCUMENTS

| | | | |
|---|---|---|---|
| 2,341,600 | 2/1944 | Daniel | 206/457 |
| 2,509,841 | 5/1950 | Rose | 40/340 UX |
| 2,789,689 | 1/1957 | Lewis . | |
| 3,415,407 | 3/1967 | Alden et al. . | |
| 3,610,411 | 10/1971 | Coleman | 206/459 |
| 3,764,003 | 10/1973 | Loss | 206/387 |
| 3,812,960 | 5/1974 | Falletta et al. . | |
| 3,866,751 | 2/1975 | Holert | 206/387 |
| 3,896,929 | 7/1975 | Mills | 206/387 |
| 4,002,355 | 1/1977 | Sendor | 206/387 |
| 4,049,119 | 9/1977 | Wilson | 206/387 |
| 4,333,568 | 6/1982 | Weldin . | |
| 4,407,410 | 10/1983 | Graetz et al. . | |
| 4,479,577 | 10/1984 | Eichner et al. . | |
| 4,488,645 | 12/1984 | Yamaguchi . | |
| 4,519,500 | 5/1985 | Perchak . | |
| 4,640,413 | 2/1987 | Kaplan et al. | 206/232 |
| 4,674,632 | 6/1987 | Friedman | 206/232 |
| 4,717,021 | 1/1988 | Ditzig | 206/387 |

FOREIGN PATENT DOCUMENTS

| | | | |
|---|---|---|---|
| 3200306 | 7/1983 | Fed. Rep. of Germany | 206/387 |
| 3325394 | 1/1985 | Fed. Rep. of Germany | 206/387 |
| 2518297 | 6/1983 | France | 206/387 |
| 2586498 | 2/1987 | France | 206/387 |
| 0319158 | 1/1970 | Sweden . | |
| 2030545 | 4/1980 | United Kingdom | 206/387 |
| 2091692 | 8/1982 | United Kingdom . | |

OTHER PUBLICATIONS

"Packaging Concept For Independent Study Courses", Vega, *IBM Technical Disclosure Bulletin*, vol. 16, No. 9, 2-1974, 206-387.

*Primary Examiner*—Jimmy G. Foster
*Attorney, Agent, or Firm*—Karl F. Milde, Jr.

[57] ABSTRACT

Display means are disclosed for aesthetically storing a signal receiving means such as video cassette tapes, audio cassette tapes or compact discs. The display means include a jacket having substantially no printing matter on an end wall facing the user. On the end wall a receiving area receives an assigned code for the program of the tapes stored in the jacket and an index booklet of the same shape and style of the jacket is provided for identifying stored programs.

3 Claims, 2 Drawing Sheets

AESTHETIC DISPLAYING DEVICE FOR VIDEO CASSETTE TAPES AND THE LIKE

FIELD OF THE INVENTION

This invention relates to a means for aesthetically displaying video cassette tapes, audio cassette tapes and compact disks on library shelves.

BACKGROUND OF THE INVENTION

Collections of tapes and disks are popular on user shelves. To date, copies of blank video and audio cassette tapes are sold in stores in protective packages. Each video tape package usually consists of a cardboard jacket which is open at one end to permit insertion of the tape and serves as a permanent dust cover. The jacket is often provided with color graphics including the name of the tape or disc manufacturer. Normally, the jacket, with the cassette inside, is surrounded by a clear, cellophane wrap which protects the jacket and keeps the cassette from falling out.

Accompanied with the video tape package and inserted inside the jacket next to the tape is a sheet containing pressure-sensitive blank labels. These labels are used to identify the program recorded on the cassette and often have preprinted indicia such as volume and title.

When such a tape is purchased, the user removes the cellophane wrap and places the cassette vertically on a shelf with either the back of the tape or the back of the jacket facing outwards. Once a program is recorded on the tape, the pressure sensitive label is placed on the spine of the jacket or cassette and replaced on the shelf.

The resulting appearance of the tapes or jackets on a library shelf with the colored graphics, the manufacturers name or logo and/or the nonuniform writing on their spines is displeasing and distracts the viewer from the appearance of the other library books.

Various display means have been devised, however, none of the prior art means achieve a pleasing shelf appearance. Until now a means of displaying such tapes and disks to achieve a uniform aesthetic appearance and at the same time provide a ready means of identifying the program contained in the display jacket has alluded discovery.

SUMMARY OF THE INVENTION

The present invention provides a display jacket for storing video cassette tapes, audio cassette tapes or compact discs aesthetically on a library shelf. In particular, the jacket has an end or spine which is substantially free of any printing material and is preferably made of a solid colored material. On the spine of the jacket, is an area for receiving an assigned code, preferably near the base wall of the jacket. The code consists of at least three numbers which may be arranged according to the preference of the user.

Although the manufacturer's name may be discretely printed on the spine of the jacket near the assigned code receiving area, no other printing matter need appear on the spine.

Along with the jacket, an index booklet is provided which is manufactured in the same shape and style as the jacket so that its appearance is indistinguishable from the jacket holding the tapes or disks on the shelf. Inside the index booklet, the code preassigned to the program on the tape or disc is preprinted and the user enters the name of the program adjacent the assigned number code.

DETAILED DESCRIPTION OF THE PREFERRED EMBODIMENTS

The invention is illustrated as used for displaying a video cassette tape; however, it is noted that a number of similar embodiments are possible for storing audio cassette tapes, compact discs, or any other signal receiving means known in the art.

Figure 1:
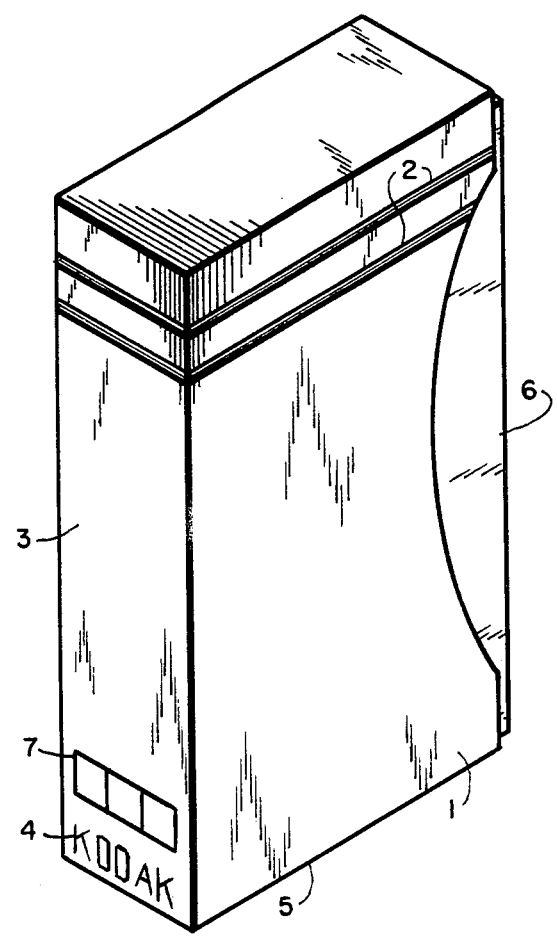
FIG. 1 is a perspective view of a inventive jacket for a video cassette tape illustrating the code receiving area.

Referring to FIG. 1, the jacket 1 is illustrated as being of a solid color and may be manufactured of any suitable material known in the art, such as cardboard, leatherette, suitable plastics, etc. Preferably, gold lines 2 are embossed on the jacket to provide an even more pleasing appearance on a library shelf.

The end wall or spine 3 of the jacket 1 is devoid of printing matter except that the manufacturer's name 4 may be included discretely near the base wall 5 of the jacket 1.

An area 7 for receiving a code for identifying the program recorded on the tape 6 contained in the jacket 1 is provided on the end wall 3, preferably near the base wall 5.

Preferably, the code receiving area 7 consists of an indented or otherwise designated space for receiving equally sized pieces or segments 8 of paper, plastic or the like, each bearing a single number or code. Any glue known in the art used to displaceably secure the segments 8 to the receiving area 7 may be used. Preferably, the segments 8 bearing the code indicia are provided with a pressure-sensitive adhesive surface for attachment to the jacket.

Figure 2:
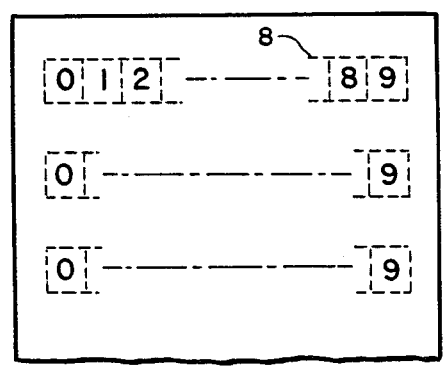
FIG. 2 is a diagrammatic illustration of strips of pressure-sensitive labels used for assigning the code to the program.

As illustrated in FIG. 2, strips of numbers ranging from 0 to 9 are preprinted in an aesthetically pleasing color, such as black lettering on a gold background. The numbers are perforated from each other along the strip such that each individual segment 8 containing a number may be removed as desired and positioned in the receiving means 7. Using the preferred paper strips, the program on the tape 6 may be assigned a code ranging from 0 to 999.

It may also be appreciated that letters or other symbols may be used to provide the code. Similarly, a system of numbering such as the Dewey Decimal System employed in public libraries may also be used.

Figure 3:
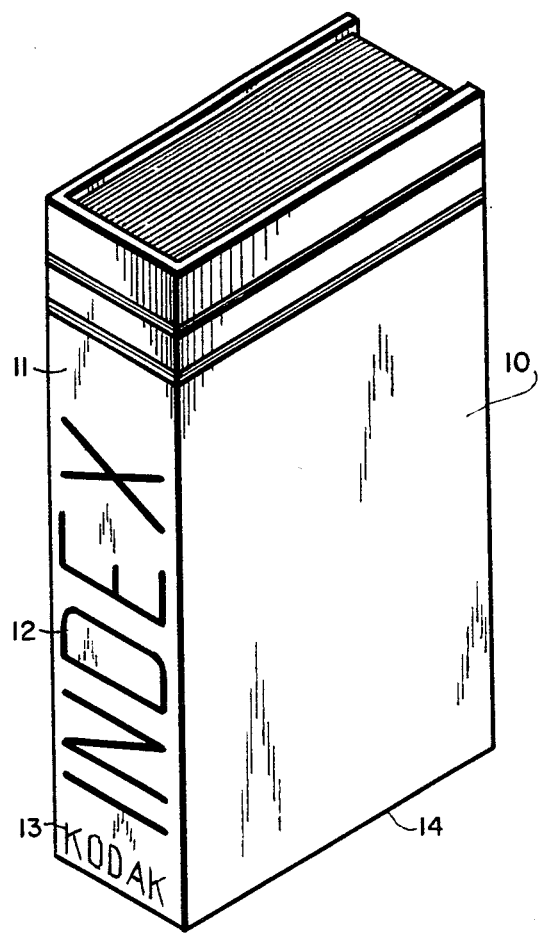
FIG. 3 is a perspective view of the index booklet accompanying the inventive jacket.

Once a code is selected for the taped program, the index jacket such as the one illustrated in FIG. 3 is needed to record the assigned code with the corresponding title of the program. The index jacket 10 has the same shape and style as the jacket 1 for the display of the tape so that when placed vertically on a library shelf, the end wall 11 provides a uniform appearance with the end wall 3 of the display jacket 1.

Preferably, indicia indicating that the booklet 10 is an index 12 is provided on the end wall 11, such as by printing the word "Index" on the spine. The manufacturer's name 13 may also be printed discretely on the spine 11 of the booklet near the base wall 14 of the index booklet 10.

Figure 4:
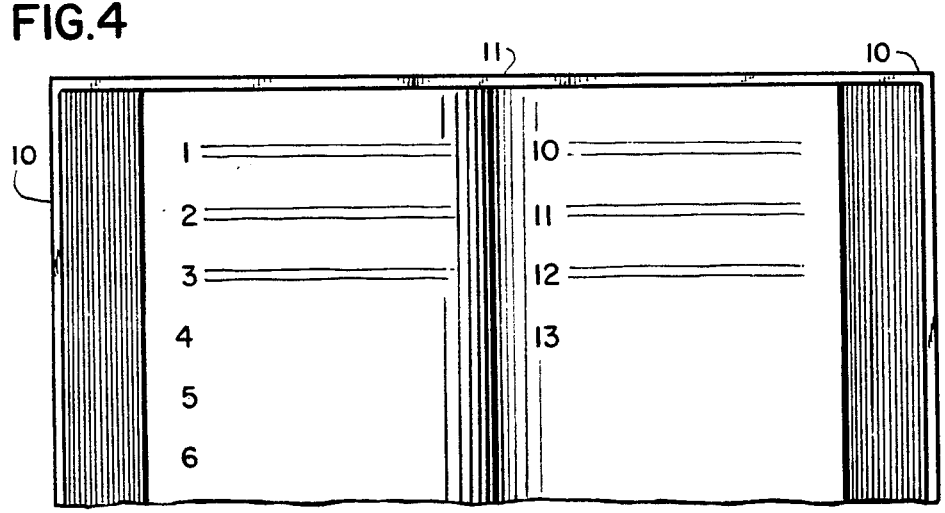
FIG. 4 is a diagrammatic illustration of the index means illustrating the assigned code and corresponding title of the index means shown in FIG. 3.

As shown in FIG. 4, the index booklet preferably has preprinted numbers ranging from 1 to 999 so that the user may record the title of the program on the tape 6 which is on the shelf.

To utilize the invention, the user removes the index booklet 10 and selects a program corresponding to a specific number code. A number code is then identified on the end wall 3 of the jacket 1 of the corresponding tape 6 and removed from the shelf for playing.

There has thus been shown and described a novel means for aesthetically displaying video cassette tapes, audio cassette tapes and CD disks on library shelves which fulfill all the objects and advantages sought therefor. Many changes, modifications, variations and other uses and application of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

I claim:

1. Library apparatus for aesthetically displaying signal receiving and storing devices comprising:

a casing member having an end wall perpendicularly connected to two parallel side walls and a base wall defining a storage jacket for holding and displaying a signal receiving and storing device, said casing member substantially free of printing matter on said end wall;

an area for receiving an assigned code for a program stored on said signal receiving and storing device, said receiving area being positioned on said end wall of said casing member;

a plurality of segments attached to said end wall in said receiving area, each segment bearing a single symbol of said assigned code; and index means comprising printed matter indicating said assigned code for said program and a corresponding name for said program, said index means disposed in a booklet defined by an end wall perpendicularly connected to two parallel side walls and a base wall having the same style and shape as said first casing member, said end wall of said booklet having printed matter indicating the index means disposed within the booklet.

2. The library apparatus according to claim 1, wherein said end walls of said casing member and said booklet are made of a solid colored leatherette material.

3. The library apparatus according to claim 1 wherein said segments are selected from a plurality of paper strips each having printed numbers in the range of zero to 9 arranged, respectively, on successive segments, each segment being separable from the remainder of the paper strip.

* * * * *